US006314106B1

(12) United States Patent
King et al.

(10) Patent No.: US 6,314,106 B1
(45) Date of Patent: Nov. 6, 2001

(54) RECEIVE PROCESSING FOR DEDICATED BANDWIDTH DATA COMMUNICATION SWITCH BACKPLANE

(75) Inventors: Wai King, Redondo Beach; Geoffrey C. Stone, Malibu; Christopher Haywood, Thousand Oaks, all of CA (US)

(73) Assignee: Alcatel Internetworking, Inc., Calabasas, CA (US)

( * ) Notice: Subject to any disclaimer, the term of this patent is extended or adjusted under 35 U.S.C. 154(b) by 0 days.

(21) Appl. No.: 09/063,493

(22) Filed: Apr. 20, 1998

(51) Int. Cl.[7] .......................... H04L 12/28; G06F 15/173
(52) U.S. Cl. .......................... 370/412; 370/421; 700/52; 709/223
(58) Field of Search .......................... 370/441, 412, 370/413, 414, 415, 416, 428, 429, 360, 362, 375, 376, 377, 378, 379, 380–381, 382, 389, 394, 395, 229, 230, 231, 232, 233, 234, 235, 465, 463, 421; 709/223–224; 710/29, 52–61

(56) References Cited

U.S. PATENT DOCUMENTS

| | | | | |
|---|---|---|---|---|
| 5,127,000 | * | 6/1992 | Henrion | 370/394 |
| 5,521,923 | * | 5/1996 | Willmann et al. | 370/412 |
| 5,914,953 | * | 6/1999 | Krause et al. | 370/392 |
| 6,026,075 | * | 2/2000 | Linville et al. | 370/236 |
| 6,084,856 | * | 7/2000 | Simmons et al. | 370/235 |
| 6,092,108 | * | 7/2000 | DiPlacido | 370/418 |
| 6,115,387 | * | 9/2000 | Egbert et al. | 370/423 |
| 6,141,323 | * | 10/2000 | Rusu | 370/236 |

OTHER PUBLICATIONS

"*exponeNT Switch Fabric Whitepaper*," May 1998, pp. 1–5, Berkeley Networks, Inc.

* cited by examiner

*Primary Examiner*—Ricky Ngo
*Assistant Examiner*—Steven Nguyen
(74) *Attorney, Agent, or Firm*—Christie, Parker & Hale, LLP

(57) ABSTRACT

A dedicated bandwidth switch backplane has efficient receive processing capable of handling highly parallel traffic. Packets must pass a filtering check and a watermark check before the receive port is allowed to release them to a queue. Highly efficient algorithms are applied to conduct the checks on the packets in a way which expedites receive processing and avoids contention. A hybrid priority/port-based arbitration algorithm is used to sequence filtering checks on pending packets. A watermark comparison algorithm performs preliminary calculations on the current packet using "projected" output queue write addresses for each possible outcome of the queueing decision on the preceding packet and using the actual outcome to select from among preliminary calculations to efficiently address the outcome-dependence of the current packet's watermark check on the queueing decision made on the preceding packet. Receive ports are operatively divided into full-write receive ports and selective-write receive ports for delivering their packets to the output queue. On the clock cycles where the selective-write receive port is assigned writing privileges, data is read from the queue, unless the selective-write receive port has indicated it wishes to write to the queue, in which case the selective-write receive port writes to the queue. The full-write receive ports always write data, if available, to the queue on the clock cycles where they are assigned writing privileges.

9 Claims, 7 Drawing Sheets

RECEIVE PROCESSING FOR DEDICATED BANDWIDTH DATA COMMUNICATION SWITCH BACKPLANE

BACKGROUND OF THE INVENTION

The present invention relates to data communication switching, and more particularly to receive processing in data communication switching architectures of the type which switch packets over dedicated transmission lines between a plurality of switching controllers.

Local area network (LAN) switches generally perform a switching function on an internal backplane operative between switching controllers supporting external network devices. Such switching has typically been accomplished by configuring the backplane as a shared packet bus and granting the switching controllers having packets for transmission control of the backplane in time-multiplexed fashion. A conventional LAN switch backplane is illustrated in FIG. 1. LAN switch 10 includes switching controllers 110, 120, 130, 140 performing a switching function by transmitting and receiving packets over shared packet bus 150. Time-multiplexing is known to have been accomplished in such conventional LAN switches several ways. One way is assigning the controllers different clock cycles within a repetitive timing cycle and granting control of the bus to the controllers round-robin in accordance with their assigned clock cycles. Another way involves conducting a priority-based arbitration among the controllers having packets for transmission and granting control of the bus to the controller which "wins" the arbitration. Regardless of which bus control strategy is favored, reliance on a shared packet bus, and its inherent requirement of time-multiplexing packets for release to guarantee contention-free transmission, has led to congestion at the transmit side of the bus and inefficient use of receive processing resources. For example, unicast packets transmitted across the backplane are destined for a network device supported by only one of the controllers. However, where the backplane is a shared packet bus, all controllers must wait for a unicast packet to clear the backplane before a subsequent packet can be transmitted. This often results in clock cycles in which the receive processing resources of many controllers are idle, even while congestion may be developing at the transmit side of the backplane.

A more efficient approach would obviate the need to time-multiplex data for release across the backplane and, under normal operating conditions, would allow all packets awaiting transmission across the backplane to be forwarded without delay. However, to reap the full benefit of such "on the fly" transmission requires receive processing resources capable of efficiently handling parallel traffic. Otherwise, the conventional problem of underutilization of receive processing resources and transmit side congestion may inadvertently become one of overutilization of receive processing resources and receive side congestion.

SUMMARY OF THE INVENTION

In its most basic feature, the present invention eliminates the inefficiencies of shared bandwidth switch backplanes by implementing a dedicated bandwidth switch backplane having efficient receive processing capable of handling highly parallel traffic. The contemplated switching architecture has a plurality of switching controllers for transmitting and receiving packets across a backplane, with each controller having a transmit interface, a receive interface and filtering logic. The backplane includes a dedicated transmission line for each transmit interface such that all transmit interfaces may simultaneously propagate data bursts to all receive interfaces. Each receive interface includes a dedicated receive port for each transmission line and an output queue. Packets must pass a filtering check and a watermark check before the receive port is allowed to release them to the output queue. Highly efficient algorithms are applied to conduct the checks on the packets in a way which expedites receive processing and avoids contention.

In one aspect of efficient receive processing, a hybrid priority/port-based arbitration algorithm is used to sequence filtering checks on packets. The hybrid algorithm prioritizes and sequences packets according to how soon their receive port would be able to begin delivering them to the output queue in the event the filtering check were allowed to proceed and the filtering and watermark checks were passed; however, the hybrid algorithm assigns all packets for which delivery could not begin within a threshold number of clock cycles the lowest priority and filtering checks are sequenced on such low priority packets according to their receive port.

In another aspect of efficient receive processing, the outcome-dependence of the current packet's watermark check on the queueing decision made on the preceding packet is addressed efficiently by a watermark comparison algorithm which performs preliminary calculations using "projected" output queue write addresses for each possible outcome of the queueing decision on the preceding packet and using the actual outcome, when available, to select from among preliminary calculations.

In another aspect of efficient receive processing, if a packet passes the filtering check but fails the watermark check, a stall condition is triggered to restrict the transmission of additional packets to the packet's receive port until the watermark check is passed.

In another aspect of efficient receive processing, receive ports are operatively divided into one or more full-write receive ports and one or more selective-write receive ports for delivering their packets to the output queue. The full-write receive ports always write data, if available, to the queue on the clock cycles during which they are assigned writing privileges. On the clock cycles during which the selective-write receive ports are assigned writing privileges, data is read from the queue, unless the selective-write receive ports have indicated they wish to write to the queue, in which case the selective-write receive ports write to the queue. By configuring relatively low-traffic ports as selective-write ports, dequeueing may accomplished during unutilized "write" clock cycles, obviating the need to designate "read only" clock cycles.

These and other aspects of the present invention can be understood by reference to the following detailed description, taken in conjunction with the accompanying drawings which are briefly described below. Of course, the actual scope of the invention is defined by the appended claims.

DETAILED DESCRIPTION OF THE PREFERRED EMBODIMENT

Figure 1:
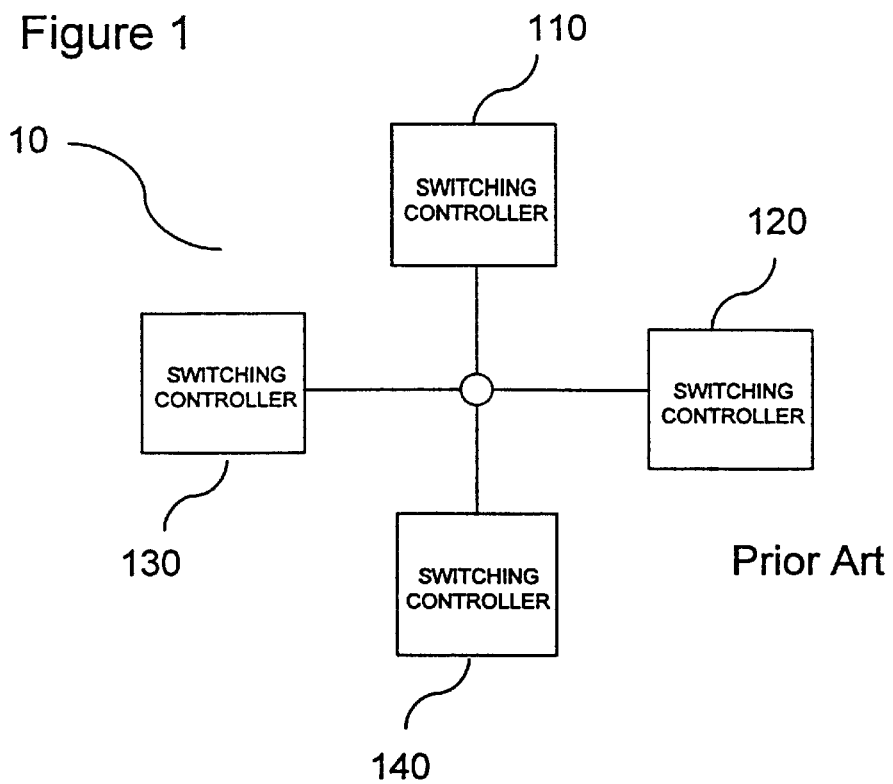
FIG. 1 is a block diagram of a prior art LAN switching backplane.
Figure 2:
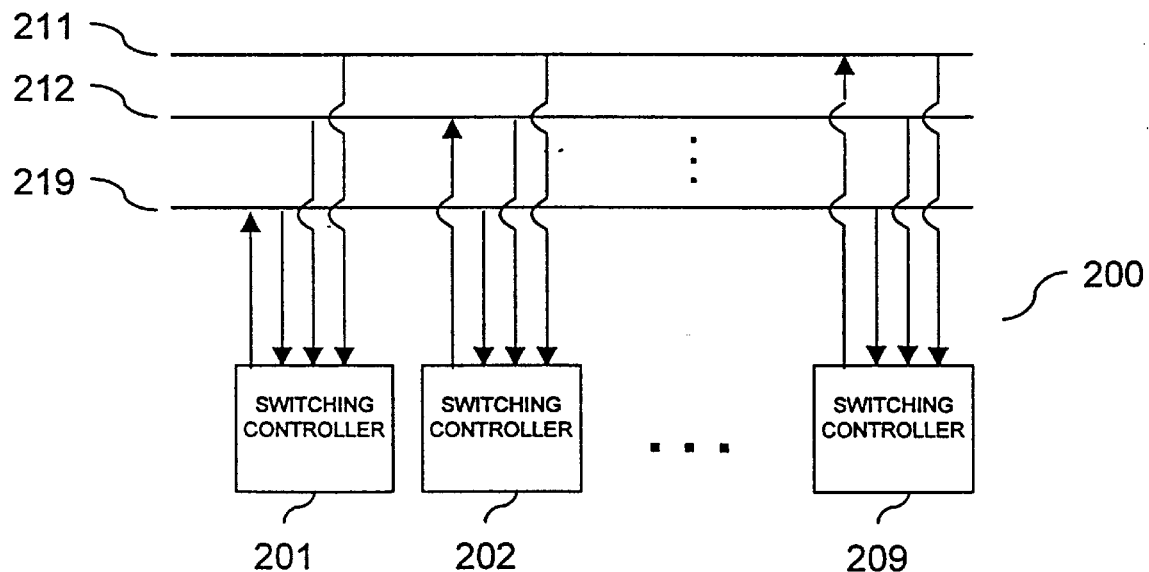
FIG. 2 is a block diagram of a LAN switching backplane with dedicated transmission lines operative.

The present invention applies to a dedicated bandwidth switching architecture such as the LAN switching architecture shown in FIG. 2. The preferred connectivity pattern includes unidirectional data transmission lines 211–219 assigned to switching controllers 201–209, respectively. Each of switching controllers 201–209 transmits packets on its dedicated one of transmission lines 211–219 and receives packets from all controllers on transmission lines 211–219. Thus, on any particular clock cycle, all controllers 201–209 may transmit a single data burst and may receive a plurality of data bursts. It will be appreciated that by dedicating a transmission line to each one of controllers 201–209, the need to transfer data across backplane 200 at a reduced rate is obviated and, under normal operating conditions, all packets for transmission across backplane 200 may be forwarded without delay. Of course, the number of controller/transmission line pairs will vary depending on network requirements. However, provided the number is greater than one, efficient receive processing resources must be implemented in the controllers to process the parallel traffic. In a preferred embodiment of the invention, receive processing resources suitable for handling parallel traffic are provided and described hereinafter in greater detail.

Figure 3:
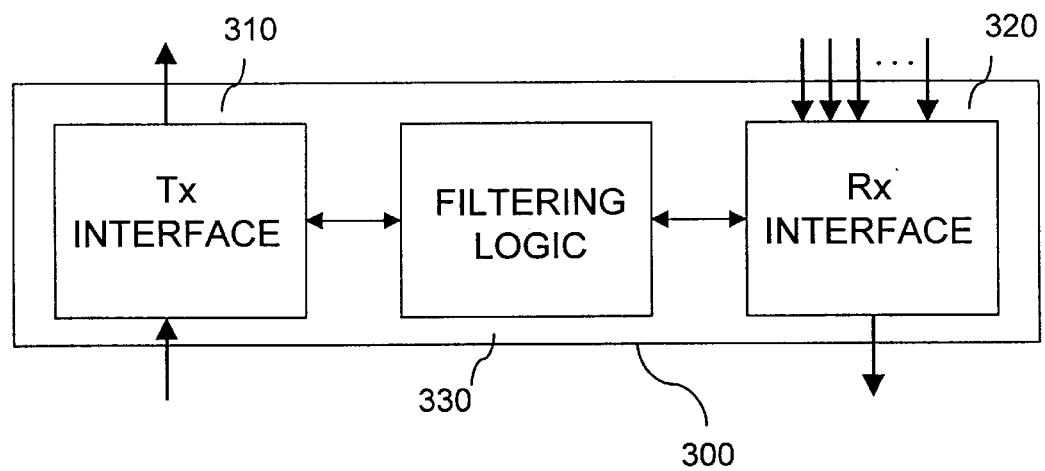
FIG. 3 is a block diagram of a switching controller operative with the LAN switching backplane according to FIG. 2.

Turning now to FIG. 3, a preferred switching controller 300 is shown. Switching controller 300 includes transmit interface 310 and receive interface 320 sharing filtering logic 330. Transmit and receive processing are preferably performed using direct memory access (DMA) techniques implemented in integrated circuitry, although processor intervention may be judiciously employed for configuration and relatively high level tasks.

Transmit interface 310 receives packets from network devices it supports (not shown), performs transmit processing on packets and selectively forwards packets across the backplane on its dedicated transmission line. Transmit interface 310 makes forwarding decisions in accordance with configured MAC bridging rules using the results of associative comparisons performed in filtering logic 330. By way of example, the following bridging rules may be enforced: Source and destination MAC addresses encoded in a received packet are compared for a match with addresses stored in filtering logic 330 known to be associated with network devices supported by transmit interface 310. If the filtering results indicate a match for the destination MAC address, filtering is indicated, in which case transmit interface 310 filters the packet. If the filtering results indicate no match for the destination MAC address, forwarding is indicated, in which case transmit interface 310 uses the filtering results as a pointer to a forwarding database, retrieves forwarding instructions for the packet and transmits the packet on the backplane with the forwarding instructions encoded. If the filtering results indicate no match for a source MAC address, transmit interface 310 subjects the address to a source learning process resulting in the address being added to the filtering logic. Of course, additional or different bridging rules may be implemented on transmit interface 310, such as a rule requiring that the source and destination MAC addresses of a packet share at least one virtual LAN (VLAN) as a condition for forwarding. Transmit interface 310 forwards packets for which forwarding is indicated on the backplane first in, first out (FIFO), in a series of data bursts.

Receive interface 320 receives packets from the backplane, performs receive processing on packets and selectively queues packets for forwarding to the network devices it supports (not shown). Receive interface 320 makes queueing decisions based on the results of filtering and watermark checks, which both must indicate queueing for queueing clearance to be granted. Filtering checks rely on associative comparisons conducted in filtering logic 330. The following MAC bridging rules may apply to filtering checks by way of example: Destination MAC addresses encoded in received packets are compared for a match with addresses stored in filtering logic 330 known to be associated with network devices it supports. If the filtering results indicate a match for the destination MAC address, queueing is indicated. If the filtering results indicate no match for the destination MAC address, filtering is indicated if no other switching controller claims the packet and queueing is indicated if another switching controller claims the packet. Naturally, additional or different bridging rules may be implemented on receive interface 320.

Filtering logic 330 may be implemented in content-addressable memory (CAM) integrated circuitry which conducts associative comparisons in a CAM on complete addresses, "pseudo CAM" integrated circuitry and software which resolves the most distinctive bits in addresses using a data hashing algorithm and conducts associative comparisons in a random access memory (RAM) on the most distinctive bits, or in conventional processor-driven software.

Figure 4:
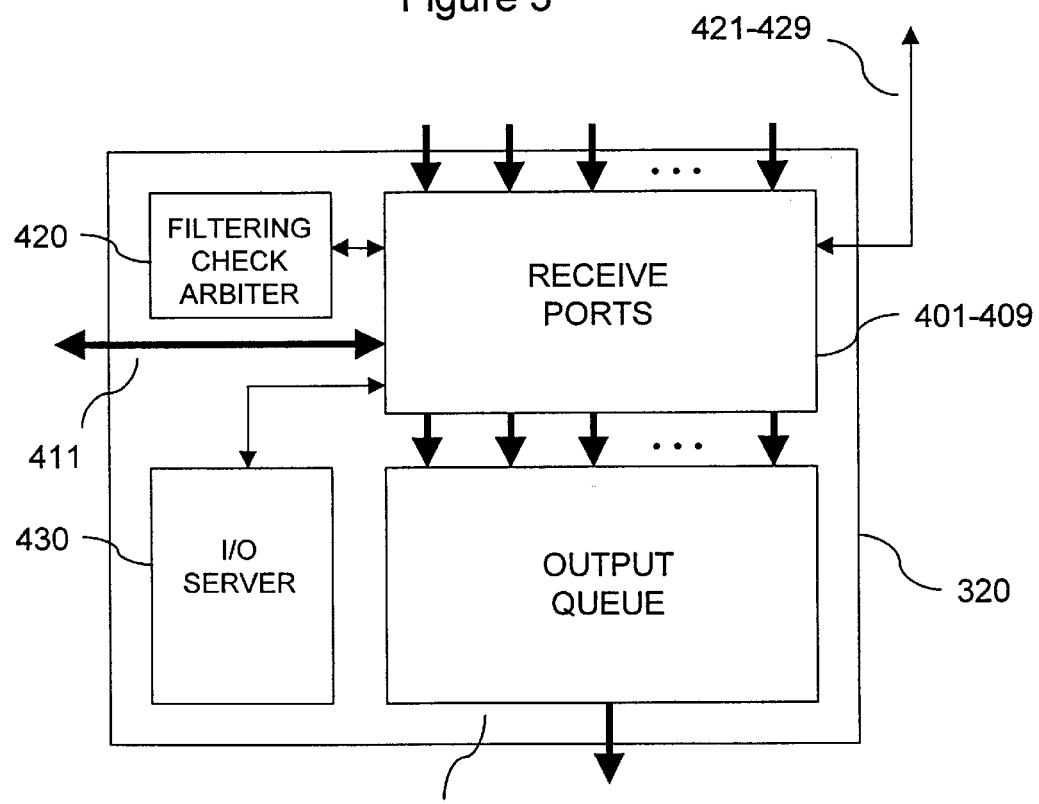
FIG. 4 is a block diagram of a receive interface operative within such a switching controller.

Turning now to FIG. 4, in a preferred embodiment of the invention, receive interface 320 is shown in greater detail. The filtering and watermark checks are initiated and conducted on receive interface 320 on a "per packet" basis with the expedient of receive ports 401–409, filtering check arbiter 420 and input/output server 430. Receive ports 401–409 each have a receive buffer fed with data bursts from the backplane on a dedicated transmission line. In this regard, returning momentarily to FIG. 2, it will be recalled that in a preferred embodiment each switching controller has a dedicated transmission line for simultaneously transmitting data bursts to all controllers such that all receive ports 401–409 may receive a data burst from all controllers on a particular clock cycle. Receive ports 401–409 initiate filtering and watermark checks and are assigned distinct "start release" clock cycles within a repetitive timing cycle such that, if both the filtering and watermark checks are passed, receive ports 401–409 initiate the release of packets to output queue 440 round-robin in accordance with their assigned "start release" clock cycles.

Figure 5:
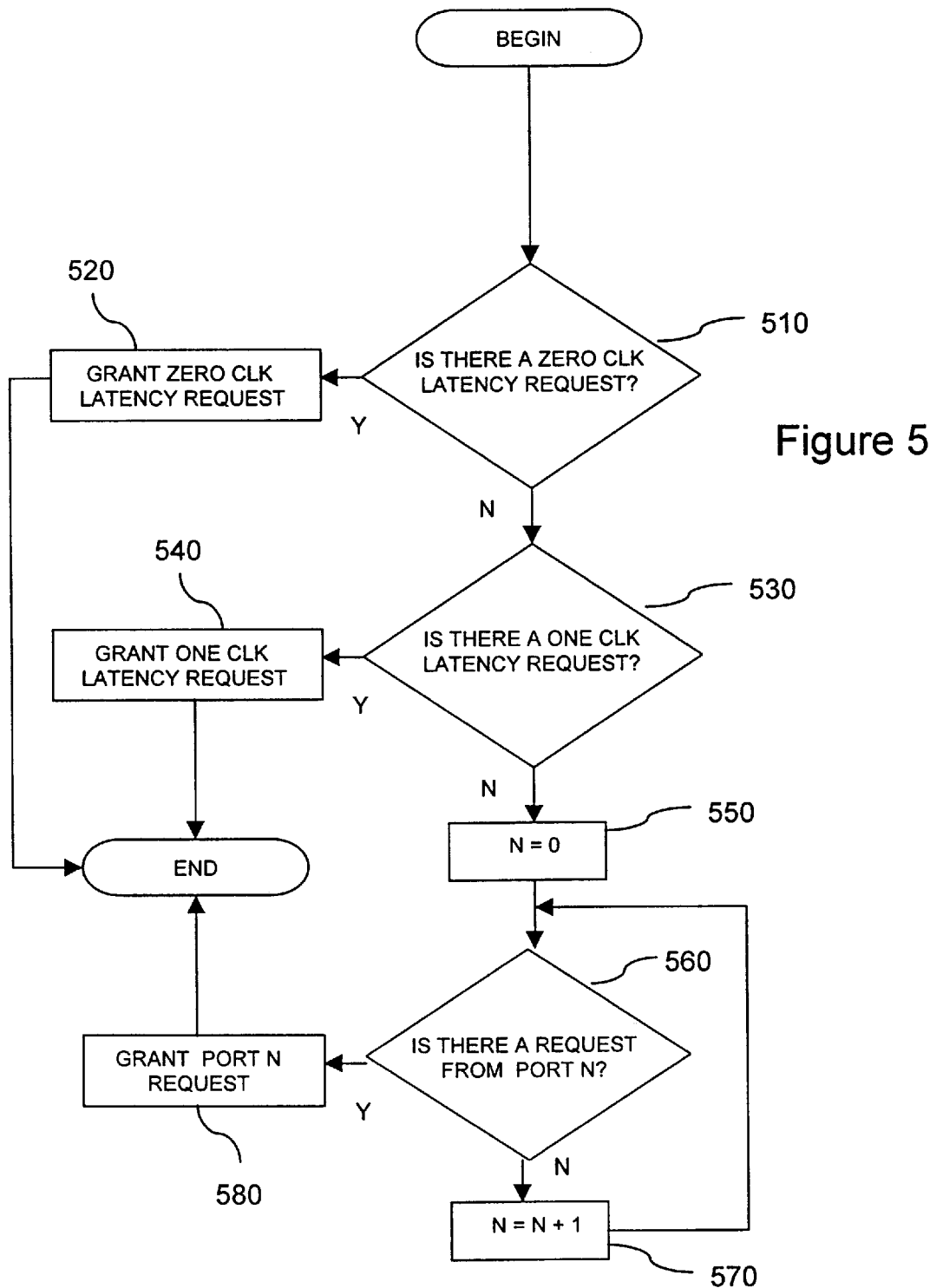
FIG. 5 is a flow diagram illustrating a filtering check arbitration algorithm operative within such a receive interface.

Filtering checks are initiated by engaging filtering check arbiter 420. In a preferred embodiment, filtering checks proceed as follows. When a sufficient number of data bursts for a packet have been received by one of receive ports 401–409, the receive port sends to arbiter 420 a request for control of bus 411 for the purpose of initiating an associative comparison in filtering logic 330. If arbiter 420 has only one request pending on a particular clock cycle, arbiter 420 automatically grants the request. If, however, arbiter 420 has multiple pending requests on a particular clock cycle, the competing requests are resolved by granting the pending request made by the one of receive ports 401–409 whose assigned "start release" clock cycle would enable it to initiate the release of its packet to output queue 440 the soonest if queueing clearance were granted, provided that a threshold latency would not be exceeded by such packet. If the threshold latency would be exceeded by all packets associated with pending requests, the requests are granted based on port number. It will be appreciated that by implementing the foregoing rules to resolve competing requests to initiate filtering checks, filtering checks are able to proceed contention-free while latency caused by the round-robin packet release initiation protocol is reduced. The filtering check arbitration algorithm implemented by arbiter 420 is illustrated in greater detail in the flow diagram of FIG. 5. When multiple requests are pending a check is made to determine if any of the requests is from a "zero clock latency" receive port, i.e., a receive port which would be able to initiate release of its packet on the first clock cycle after receiving forwarding clearance (510). If there is a "zero clock latency" request, the request is granted (520). If not, a check is made to determine if any of the requests is from a "one clock latency" receive port (530). If there is a "one clock latency" request, the request is granted (540). If not, arbiter 420 grants the request which is associated with the lowest-numbered receive port (550, 560, 570, 580). Because clock latency is a determinable constant for each clock cycle and port number pair, latency determinations may be made by consulting a pre-configured "look-up" table in arbiter 420.

Filtering checks are conducted by engaging filtering logic 330 over bus 411. The receive port whose request is granted transmits the destination MAC addresses of its packet to filtering logic 330 on bus 411. Filtering logic 330 eventually returns filtering results on bus 411 indicating whether a match for the destination MAC address was found. If the filtering results indicate that a match was found, the receive port will eventually queue the packet. Because MAC bridging rules indicate forwarding by all switching controllers if no controller claims a packet transmitted over the backplane, the receive port advises other controllers that it has claimed the packet. For this purpose, receive ports 401–409 have claim lines 421–429. The receive port which will eventually queue the packet asserts its claim line after learning that the filtering results indicate that a match was found. If the filtering results indicate that no match was found, the receive port checks whether any other controller has asserted the claim line. If either the filtering results indicate that a match was found, or the claim line has not been asserted, the packet has passed the filtering check and will eventually be queued. Otherwise, the packet has failed the filtering check and will be dropped.

Watermark checks are initiated by engaging input/output server 430. The condition for passing a watermark check is:

WM>(WADDR−RADDR)+SZ where

WM=the output queue watermark;
WADDR=the output queue write address, adjusted upward to account for queue space definitively allocated to but not yet filled by preceding packets;
RADDR=the output queue read address; and
SZ=the size of the current packet.

Figure 6:
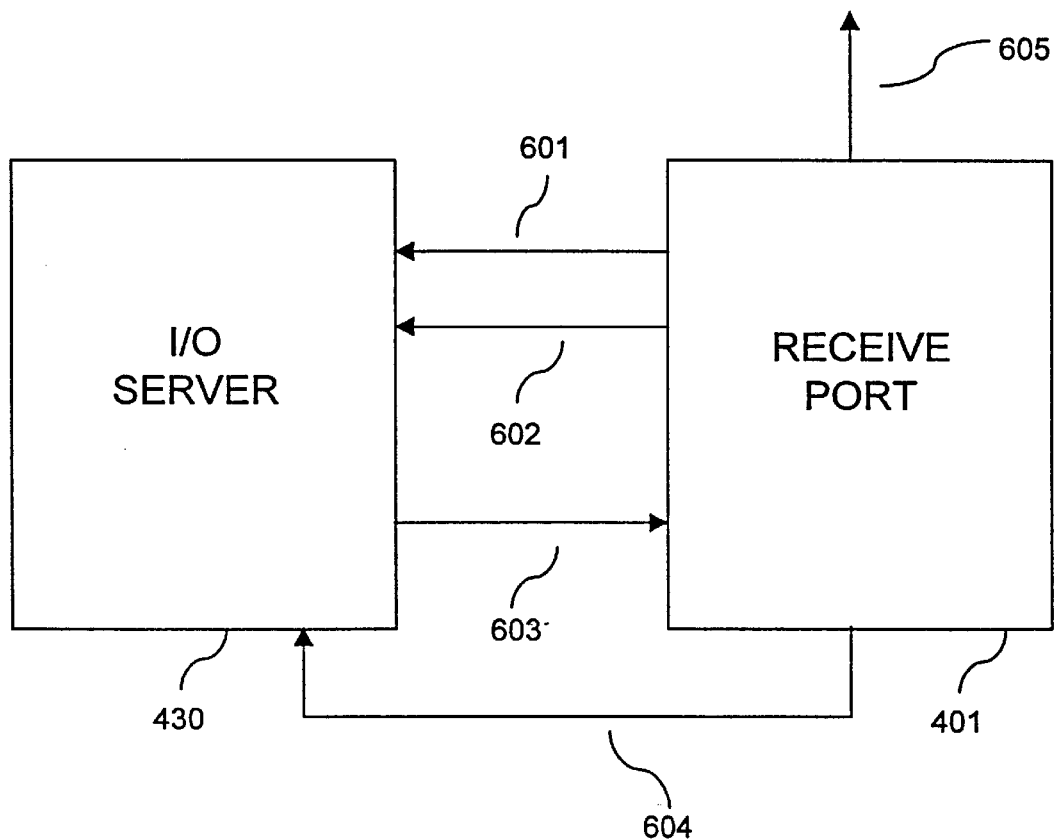
FIG. 6 is a block diagram of the interfaces operative between a receive port and an input/output server for exchanging signals within such a receive interface.

Receive ports 401–409 are assigned distinct "start check" clock cycles within a repetitive timing cycle for initiating watermark checks. The "start check" clock cycles assigned to a port may differ from its assigned "start release" clock cycle. In a preferred embodiment, watermark checks proceed as follows. Referring to FIG. 6, receive port 401 and input/output server 430 have control lines 601–604 running between them, including request line 601, packet size line 602, grant line 603 and feedback line 604, for exchanging necessary signals. In practice, of course, all receive ports 401–409 will individually exchange such signals with server 430 in similar fashion over similar lines. Receive port 401 initiates a watermark check by validating request line 601 and conveying on size line 602 the size of its current packet. Server 430 implements the preferred watermark comparison algorithm to determine whether or not allocating output queue space in the requested size amount would violate an established watermark for output queue 440 and either grants or denies the request over grant line 603. If a grant is issued, the packet has passed the watermark check. Otherwise, the packet has failed the watermark check.

Figure 7:
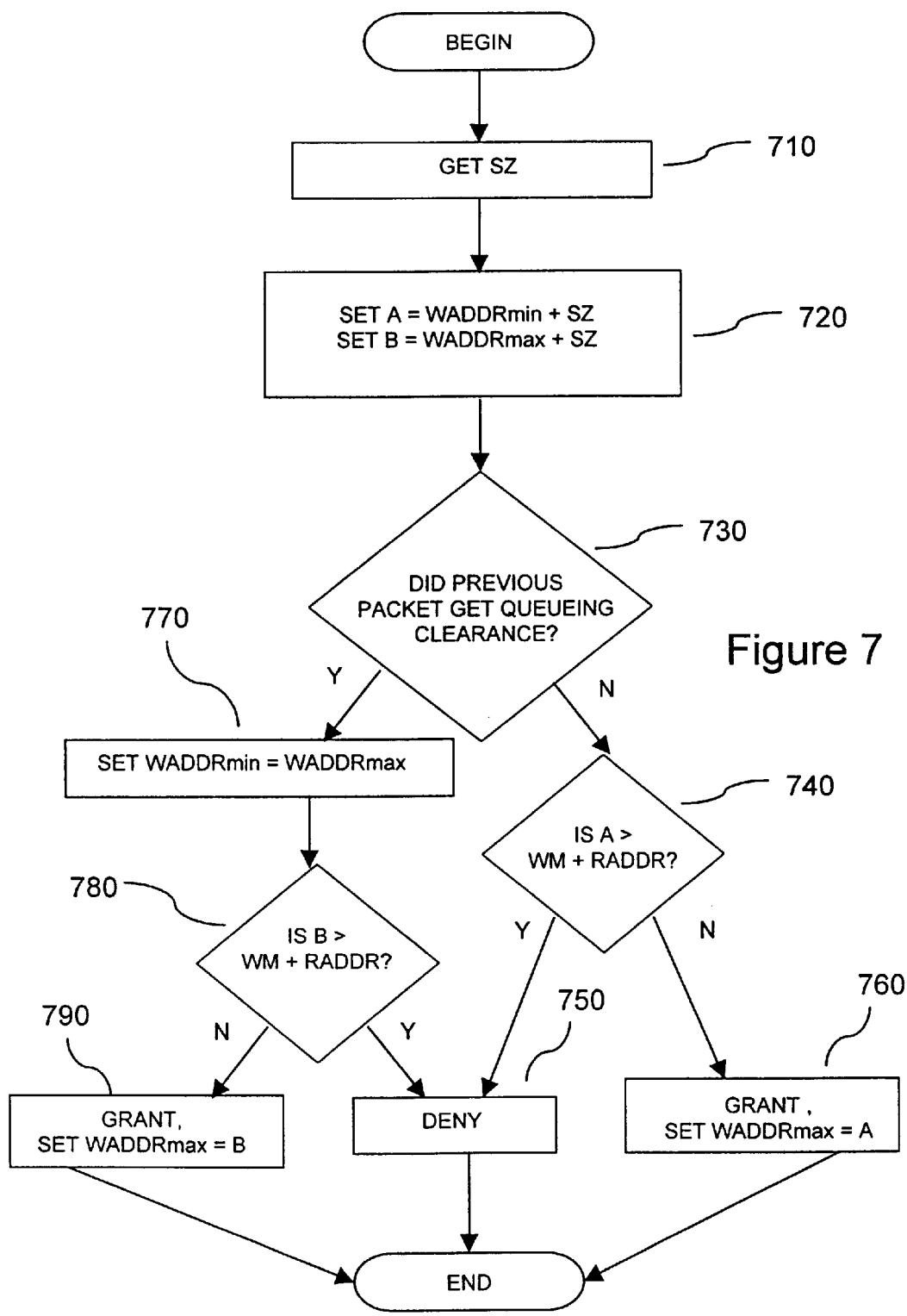
FIG. 7 is a flow diagram of a watermark comparison algorithm operative within such a receive interface.

The watermark check is complicated somewhat by its outcome-dependence on preceding queueing decisions. More particularly, to conduct an accurate watermark check on a current packet, it must be known how much output queue space has been definitively allocated to preceding packets, i.e., it must be known for each preceding packet whether queueing clearance was granted. To enable watermark checks to be conducted efficiently in integrated circuitry despite this outcome-dependence, the preferred watermark comparison algorithm makes preliminary calculations on the current request using "projected" output queue write addresses for each possible outcome of the queueing decision on the preceding packet and applies the actual outcome to select from among the preliminary calculations. The preferred watermark comparison algorithm is illustrated in greater detail by reference to FIG. 7, which may be profitably reviewed in conjunction with FIG. 6. Server 430 obtains the current packet size (SZ) from receive port 401 on size line 602 (710) and separately adds the packet size to a "minimum projected" write address (WADDRmin) and a "maximum projected" write address (WADDRmax) (720). Feedback is applied on feedback line 604 to indicate whether the preceding packet received queueing clearance (730). Naturally, queueing clearance was received if the preceding packet passed both the filtering check and the watermark check, and was otherwise not received. If queueing clearance was not received, the sum calculated using the "minimum projected" write address is compared with the sum of the watermark (WM) and the current read address (RADDR) (740). If the comparison indicates that the sum calculated using the "minimum projected" write address exceeds WM+RADDR, the request is denied (750) such that the watermark check is failed. If the comparison indicates that the sum calculated using the "minimum projected" write address does not exceed WM+RADDR, the request is granted (760) such that the watermark check is passed and the "maximum projected" write address is assigned the value of the sum of the "minimum projected" write address and the current packet size. Turning now to the other branch of FIG. 7, if queueing clearance was received by the preceding packet, the "minimum projected" write address is assigned the value of the "maximum projected" write address (770) and the sum calculated using the "maximum projected" write address is compared with the sum of the watermark (WM) and the current read address (RADDR) (780). If the comparison indicates that the sum calculated using the "maximum projected" write address exceeds WM+RADDR, the request is denied (750) such that the watermark check is failed. If the comparison indicates that the sum calculated using the "maximum projected" write address does not exceed WM +RADDR, the request is granted (790) such that the watermark check is passed and the "maximum projected" write address is assigned the value of the sum of the "maximum projected" write address and the current packet size. A watermark check may then be accurately performed on the subsequent packet using the newly-calculated values. Server 430 conveys grants to receive port 401 on grant line 603. The watermark (WM) is a predetermined constant indicating the maximum amount of output queue space which may be allocated and is preferably configurable. The read address (RADDR) is, of course, a variable retained by output queue 440 and incremented as packets are dequeued.

If a packet passes the filtering check but fails the watermark check, forwarding is indicated but the packet is delayed at its receive port to prevent output queue overflow. To avoid having the delayed packet overwritten by a subsequent packet transmitted to the receive port over the backplane, the receive port imposes a stall condition to suspend the transmission of subsequent packets until release of the current packet to output queue 440 is secured. Referring to FIG. 6, to impose the stall condition, receive port 401 has stall line 605 which runs from receive port 401 to the associated transmit interface, which receive port 401 asserts after it learns that its current packet will be eventually be forwarded but must be held in abeyance. In the stall mode, receive port 401 continues to initiate watermark checks with server 430 on its assigned "start check" clock cycle until a grant is received, at which time the stall condition is lifted by deactivating stall line 605. Naturally, each of receive ports 401–409 has a stall line and stall conditions are imposed on a "per port" basis to avoid unnecessary disruption in the flow of packets over backplane.

Figure 8:
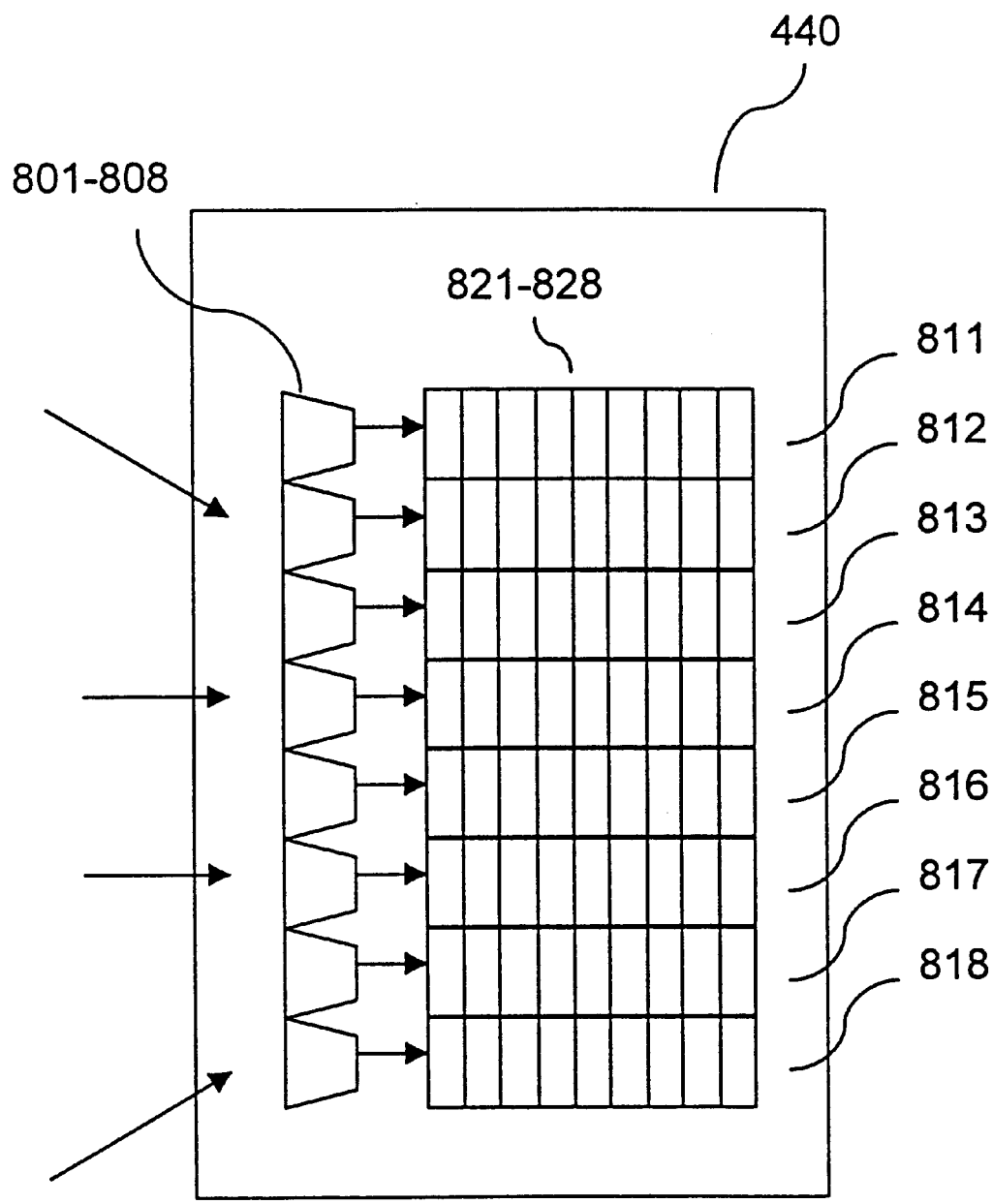
FIG. 8 is a block diagram of an output queue operative within such a receive interface.

Receive ports 401–409 initiate release to output queue 440 of packets for which queueing clearance has been received on their assigned "start release" clock cycles. In a preferred embodiment, receive ports 401–408 are operative as full-write ports and receive port 409 is operative as a selective-write port for releasing packets to output queue 440. Each packet is released in a series of constant-bit words in accordance with a repetitive nine-clock timing cycle. Referring to FIG. 8, output queue 440 is arranged as a rotating crossbar which includes multiplexors 801–808 equal to the number of fill-write ports 401–408 and followed by an equal number of physical memories 811–818. Physical memories 811–818 each have the capacity to store numerous constant-bit words delivered from their associated one of multiplexors 801–808 and are "stacked" such that they combine to form distinct logical packet queues, with each logical packet queue having the capacity to store up to eight constant-bit words from the same packet. Each constant-bit word released by ports 401–409 is made available to all multiplexors 801–808, which each select a different word from among the words made available on each clock and deliver the selected word to their associated one of physical memories 811–818. Multiplexors 801–808 select words from ports 401–409 round-robin and are staggered such that no two multiplexors ever select the same word. In operation, each of ports 401–409 is assigned writing privileges on eight clocks within the nine-clock repetitive timing cycle. The clock assignment of writing privileges is staggered such that eight ports have writing privileges on each clock. On each clock for which it has writing privileges, each full-allocation port 401–408 releases to multiplexors 801–808 a constant bit word from a packet for which queueing clearance was received and queueing has begun in accordance with the packet release initiation protocol, if available. On each clock for which selective-write port 409 has writing privileges, if port 409 has requested to exercise its writing privileges, port 409 releases to multiplexors 801–808 a constant bit word, but if port 409 has not requested to exercise its writing privileges, a constant bit word is read from the one of physical memories 811–818 to which port 409 might have otherwise written. Port 409 exercises its writing privileges whenever a packet for which queueing clearance was received and queueing has begun in accordance with the packet release initiation protocol is available. It will be appreciated that by configuring relatively low-traffic receive ports as selective-write ports within the foregoing scheme, dequeueing may be accomplished during unutilized "write" clock cycles.

Figure 9:
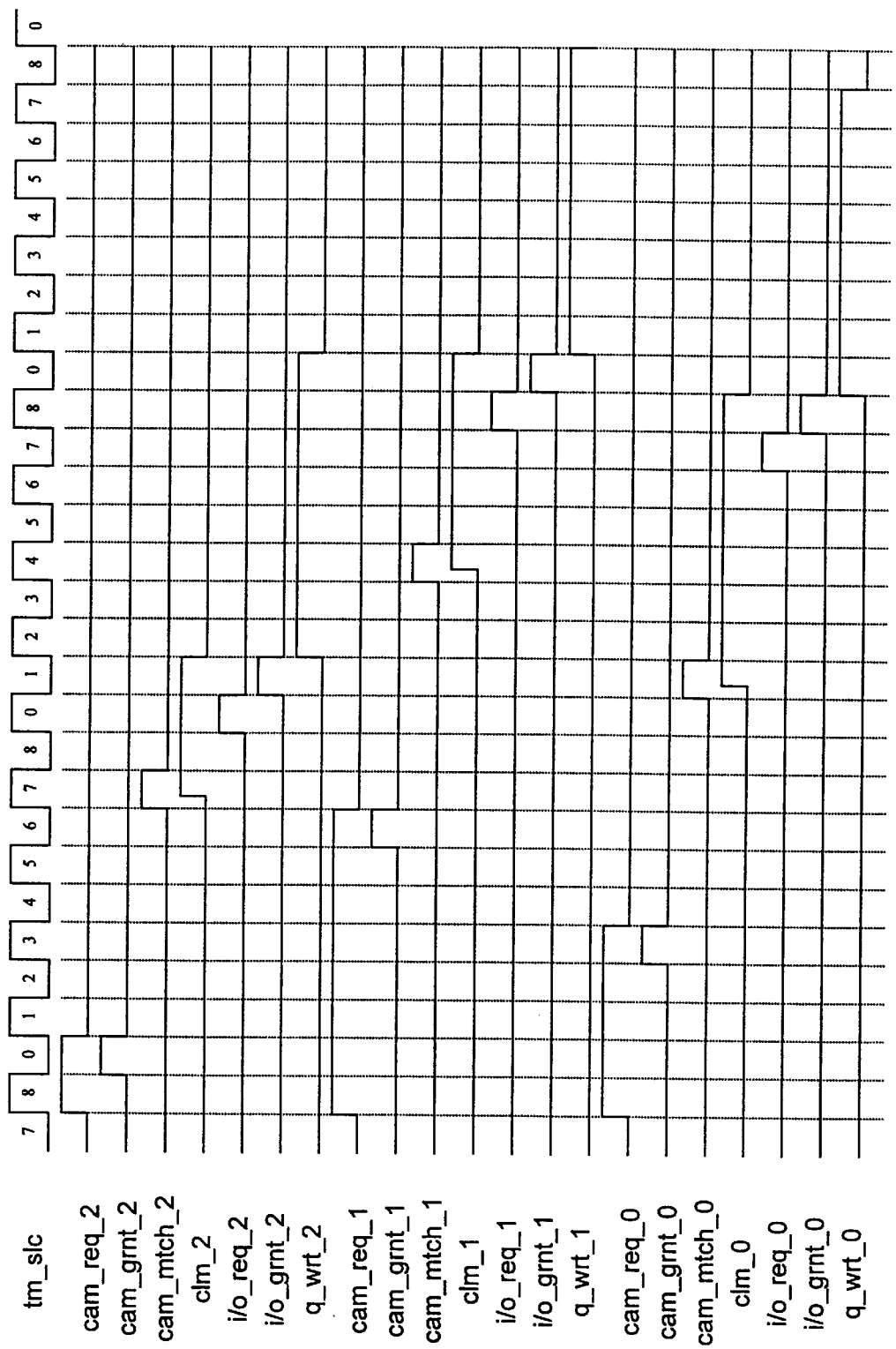
FIG. 9 is a timing diagram illustrating receive processing timing within such a receive interface.

Turning now to FIG. 9, a timing diagram illustrates receive processing within receive interface 320 in accordance with a preferred embodiment of the invention. Signal tm_slice indicates the current clock cycle or "time slice" within a repetitive timing cycle. Signals in the form cam_req_n indicate whether receive port n has issued a request to arbiter 420 on the current time slice. Signals cam_grnt_n indicate whether arbiter 420 has granted a request issued by receive port n on the current time slice. Signals cam_mtch_n indicate whether filtering results returned from filtering logic 330 on the current time slice indicate a match. Signals clm_n indicate whether receive port n is asserting its claim line on the current time slice. Signals i/o_req_n indicate whether receive port n has issued a request to server 430 on the current time slice. Signals i/o_grnt_n indicate whether server 430 has granted a request issued by receive port n on the current time slice. Finally, signals q_wrt_n indicate whether receive port n is writing a constant-bit word to output queue 440 on the current time slice. In the illustrated sequence, on time slice eight, cam_req_0, cam_req_1 and cam_req_2 are pulsed high indicating that ports zero, one and two have issued requests to initiate filtering checks. On time slice zero, cam_grnt_2 is pulsed high, indicating that an arbitration has been conducted and port two's request has been granted. Naturally, under the preferred filtering check arbitration algorithm, port two's request was chosen over port zero's and port one's requests because port two is a "low clock latency" port on time slice eight. On time slice one, cam_req_2 is deasserted, while cam_req_0 and cam_req_1 continue to be asserted and will be considered by the arbiter 420 in the next arbitration. On time slices one through three, port two sends the destination MAC address of its current packet to filtering logic 330 for associative comparison. On time slice three, cam_grnt_0 is pulsed high, indicating that a second arbitration has been conducted and port zero's request has been granted. Naturally, port two's request was chosen over port one's request because neither port zero or port one is a "low clock latency" port on time slice two and port zero has a lower port number. On time slice four, cam_req_0 is deasserted, while cam_req_1 continues to be asserted and will be considered in the next arbitration. On time slices four through six, port zero sends the destination MAC address of its current packet for associative comparison. On time slice six, cam_grnt_1 is pulsed high, indicating that a third arbitration has been conducted and port one's request has been granted. On time slice seven, cam_req_1 is deasserted. Also on time slice seven, cam_mtch_2 is pulsed high, indicating that a match for the destination MAC address of port two's current packet was found. On time slice eight, clm_2 is pulsed high, indicating that port two has claimed its current packet for eventual queueing. On time slice zero, i/o_req_2 is pulsed high, indicating that port two has initiated a watermark check. Naturally, port two is assigned time slice zero for initiating watermark checks. On time slice one, i/o_grnt_2 is pulsed high, indicating that a watermark comparison has been conducted and port two's request has been granted. Also on time slice one, cam_mtch_0 is pulsed high, indicating that a match for the destination MAC address of port zero's current packet was found. On time slice two, q_wrt_2 become active, indicating that port two is writing output queue 440. Naturally, port two is assigned time slice two for initiating the release of a packet to output queue 440. Also on time slice two, clm_2 is deasserted indicating that queueing of the current packet on port two has begun and clm_0 is pulsed high, indicating that port zero has claimed its current packet for eventual queueing. On time slice four, cam_mtch_1 is pulsed high, indicating that a match for the destination MAC address of port one's current packet was found. On time slice five, clm_1 is pulsed high, indicating that port one has claimed its current packet for eventual queueing. On time slice seven, i/o_req_0 is pulsed high, indicating that port zero has initiated a watermark check. Naturally, port one is assigned time slice seven for initiating watermark checks. On time slice eight, i/o_grnt_0 is pulsed high, indicating that a watermark comparison has been conducted and port zero's request has been granted. Also on time slice eight, i/o_req_1 is pulsed high, indicating that port one has initiated a watermark check. On time slice zero, q_wrt_0 become active, indicating that port zero is writing output queue 440. Naturally, port zero is assigned time slice zero for initiating the release of a packet to output queue 440. Also on time slice zero, clm_0 is deasserted indicating that queueing of the current packet on port zero has begun and i/o_grnt_1 is pulsed high, indicating that a watermark comparison has been conducted and port one's request has been granted. On time slice one, q_wrt_1 become active, indicating that port one is writing output queue 440. Naturally, port one is assigned time slice one for initiating the release of a packet to output queue 440. Also on time slice one, clm_1 is deasserted indicating that queueing of the current packet on port one has begun and q_wrt_2 become inactive, indicating that queueing of the current packet on port zero has been completed. q_wrt_0 and q_wrt_1 become inactive on subsequent time slices eight and zero, respectively, to complete the illustrated receive processing sequence.

It will be appreciated by those of ordinary skill in the art that the invention can be embodied in other specific forms without departing from the spirit or essential character hereof. The present description is therefore considered in all respects illustrative and not restrictive. The scope of the invention is indicated by the appended claims, and all changes that come within the meaning and range of equivalents thereof are intended to be embraced therein.

We claim:

1. In a data switching system having a plurality of switching controllers for exchanging data units over a backplane, at least one controller having an interface for transmitting data on the backplane and an interface having a plurality of ports for receiving data off the backplane in parallel from all transmitting interfaces, wherein at least one port is assigned a different clock cycle within a repetitive timing cycle for initiating the release of a data unit to a queue, and wherein at least one data unit must pass a filtering check and a watermark check to receive queueing clearance, a method for conducting receive processing, comprising:

sequencing the data units for conducting the filtering check;

conducting the filtering check on the data units in accordance with the sequence;

conducting the watermark check on the data units;

filtering the data units which fail the filtering check;

delaying the data units which pass the filtering check and fail the watermark check, until the watermark check is passed; and queueing the data units which pass the filtering check and the watermark check, wherein the step of sequencing the data units comprises:
(a) determining the ports on which the data units were received;
(b) determining the current clock cycle within a repetitive timing cycle;
(c) from the determinations in (a) and (b), assigning a priority to at least one data unit as a function of the number of clock cycles the data unit's port would have to wait before initiating the release of the data unit in the event queueing clearance for the data unit were received; and
(d) sequencing the data units in accordance with their assigned priorities, and wherein a data unit is assigned the lowest priority if the number of clock cycles the data unit's port would have to wait exceeds a threshold number, and wherein data units assigned the same priority are sequenced in accordance with their ports.

2. In a data switching system having a plurality of switching controllers for exchanging data units over a backplane, at least one controller having an interface for transmitting data on the backplane and an interface having a plurality of ports for receiving data off the backplane in parallel from all transmitting interfaces, wherein at least one port is assigned a different clock cycle within a repetitive timing cycle for initiating the release of a data unit to a queue, and wherein at least one data unit must pass a filtering check and a watermark check to receive queueing clearance, a method for conducting receive processing, comprising:

sequencing the data units for conducting the filtering check;

conducting the filtering check on the data units in accordance with the sequence;

conducting the watermark check on the data units;

filtering the data units which fail the filtering check;

delaying the data units which pass the filtering check and fail the watermark check, until the watermark check is passed; and queueing the data units which pass the filtering check and the watermark check, wherein the step of conducting the watermark check comprises:
determining size of a current data unit for the watermark check;
calculating a, where a is the sum of a minimum projected write address and the size of the current data unit;
calculating b, where b is the sum of a maximum projected write address and the size of the current data unit;
calculating c, where c is the sum of a watermark and the current read address;
determining if a preceding data unit for the watermark check received queueing clearance;

if the preceding data unit received queuing clearance and b≦c, replacing the minimum projected write address with the maximum projected write address, passing the current data unit and replacing the maximum projected write address with b;

if the preceding data unit received queuing clearance b>c, replacing the minimum projected write address with the maximum projected write address and failing the current data unit;

if the preceding data unit did not receive queuing clearance and a≦c, replacing the maximum projected write address with a and passing the current data unit; and if the preceding data unit did not receive queuing clearance and a>c, failing the current data unit.

3. In a data queueing system including a plurality of ports, at least one port having a data unit for release to a queue and at least one port assigned a different clock cycle within a repetitive timing cycle for initiating the release of the data unit to the queue, and wherein at least one data unit must pass a filtering check as a condition for receiving queuing clearance, a method for sequencing data units received on the ports for the filtering check, comprising:

(a) determining the port on which the data units were received;

(b) determining the current clock cycle within a repetitive timing cycle;

(c) from the determinations in (a) and (b), assigning a priority to at least one data unit as a function of the number of clock cycles the data unit's port would have to wait before initiating the release of the data unit in the event queueing clearance for the data unit were received; and (d) sequencing the data units in accordance with their assigned priorities, wherein the data unit is assigned the lowest priority if the number of clock cycles the port would have to wait exceeds a threshold number and wherein data units assigned the same priority are sequenced in accordance with their ports.

4. In a data queueing system in which data units must pass a watermark check as a condition for receiving queueing clearance, a method for conducting the watermark check, comprising:

determining size of a current data unit for the watermark check;

calculating a, where a is the sum of a minimum projected write address and the size of the current data unit;

calculating b, where b is the sum of a maximum projected write address and the size of the current data unit;

calculating c, where c is the sum of a watermark and the current read address;

determining if a preceding data unit for the watermark check received queueing clearance;

if the preceding data unit received queueing clearance and b≦c, replacing the minimum projected write address with the maximum projected write address, passing the current data unit and replacing the maximum projected write address with b;

if the preceding data unit received queueing clearance b>c, replacing the minimum projected write address with the maximum projected write address and failing the current data unit;

if the preceding data unit did not receive queueing clearance and a≦c, replacing the maximum projected write address with a and passing the current data unit; and if the preceding data unit did not receive queueing clearance and a>c, failing the current data unit.

5. The method for conducting a watermark check according to claim 4, wherein the maximum projected write address and the minimum projected write address are initially configured to be zero.

6. The method for conducting a watermark check according to claim 4, wherein the watermark is a configurable constant.

7. The method for conducting a watermark check according to claim 4, wherein the read address is incremented in the amount of any dequeued data.

8. The method for conducting a watermark check according to claim 4, further comprising:

if the current data unit is failed and a stall mode is not active, activating the stall mode.

9. The method for conducting a watermark check according to claim 8, further comprising:

if the current data unit is passed and the stall mode is active, deactivating the stall mode.

* * * * *